(12) United States Patent
Davis

(10) Patent No.: US 7,740,256 B2
(45) Date of Patent: Jun. 22, 2010

(54) COMPRESSIBLE FLUID INDEPENDENT ACTIVE SUSPENSION

(75) Inventor: Leo W. Davis, Dallas, TX (US)

(73) Assignee: Horstman, Inc., Washington, MI (US)

( * ) Notice: Subject to any disclaimer, the term of this patent is extended or adjusted under 35 U.S.C. 154(b) by 354 days.

(21) Appl. No.: 11/666,316

(22) PCT Filed: Oct. 25, 2005

(86) PCT No.: PCT/US2005/038069
§ 371 (c)(1),
(2), (4) Date: Apr. 25, 2007

(87) PCT Pub. No.: WO2006/047353
PCT Pub. Date: May 4, 2006

(65) Prior Publication Data
US 2008/0111324 A1 May 15, 2008

Related U.S. Application Data

(60) Provisional application No. 60/622,247, filed on Oct. 25, 2004.

(51) Int. Cl.
*B60G 17/00* (2006.01)
(52) U.S. Cl. .......................... 280/124.157; 280/124.16; 188/317; 267/64.25; 267/64.24
(58) Field of Classification Search .......... 280/124.157, 280/124.16; 267/64.15, 64.25, 64.26; 188/313, 188/316, 317, 319.1, 322.15, 304
See application file for complete search history.

(56) References Cited

U.S. PATENT DOCUMENTS

| | | | |
|---|---|---|---|
| 4,315,556 A | 2/1982 | Timoney | |
| 4,613,009 A | 9/1986 | Nakamura et al. | |
| 4,714,270 A | 12/1987 | Rumpel | |
| 4,848,789 A | 7/1989 | Timoney et al. | |
| 4,886,248 A * | 12/1989 | Delhaye et al. | 267/64.26 |
| 5,156,414 A | 10/1992 | Fayard et al. | |
| 5,197,755 A | 3/1993 | Quick | |
| 5,219,152 A * | 6/1993 | Derrien et al. | 267/64.15 |
| 5,295,563 A * | 3/1994 | Bennett | 188/266.2 |
| 5,538,274 A | 7/1996 | Schmitz et al. | |
| 5,779,007 A * | 7/1998 | Warinner | 188/289 |
| 5,820,150 A | 10/1998 | Archer et al. | |
| 5,988,607 A * | 11/1999 | Beck | 267/64.26 |
| 6,042,091 A * | 3/2000 | Marzocchi et al. | 267/64.15 |
| 6,105,984 A | 8/2000 | Schmitz et al. | |
| 6,264,212 B1 | 7/2001 | Timoney | |
| 6,357,954 B1 | 3/2002 | Timoney | |
| 6,389,341 B1 | 5/2002 | Davis | |
| 6,598,885 B2 * | 7/2003 | Delorenzis et al. | 280/5.507 |
| 6,619,445 B2 * | 9/2003 | Forster | 188/315 |
| 6,783,136 B2 | 8/2004 | Pronsias Timoney et al. | |

* cited by examiner

*Primary Examiner*—Ruth Ilan
(74) *Attorney, Agent, or Firm*—Mark W Handley

(57) ABSTRACT

An active, independent suspension system has dual piston, compressible fluid struts (22). Each of the dual piston struts (22) has an outer cylinder (24) and an outer piston rod (30), which each respectively define exterior peripheries for an outer pressure chamber (32) and an inner pressure chamber (54). Pressures applied to a compressible fluid (56) in respective ones of the outer and inner pressure chambers (32, 54) urge the outer piston to extend from within the outer cylinder (24). A control system (240) is provided for actively controlling an amount of compressible fluid (56) disposed within each of the outer and inner chambers (32, 54).

11 Claims, 14 Drawing Sheets

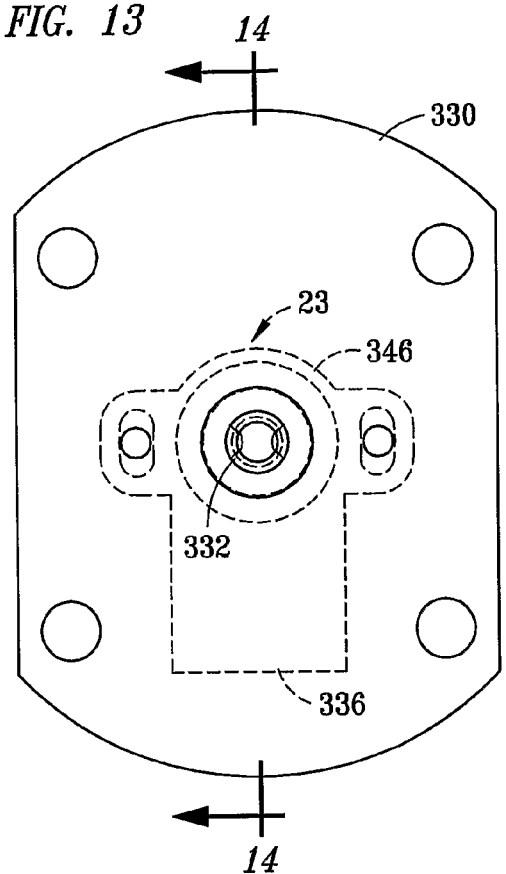
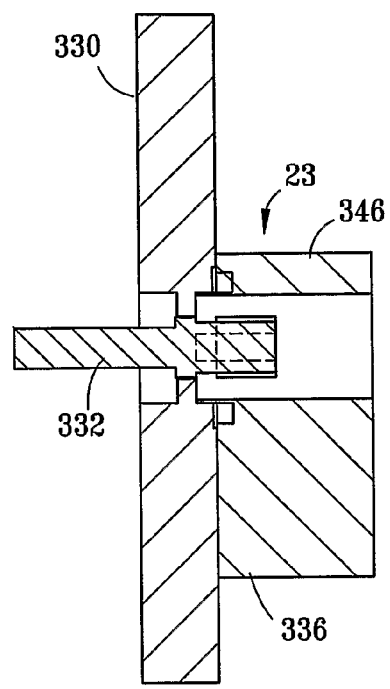
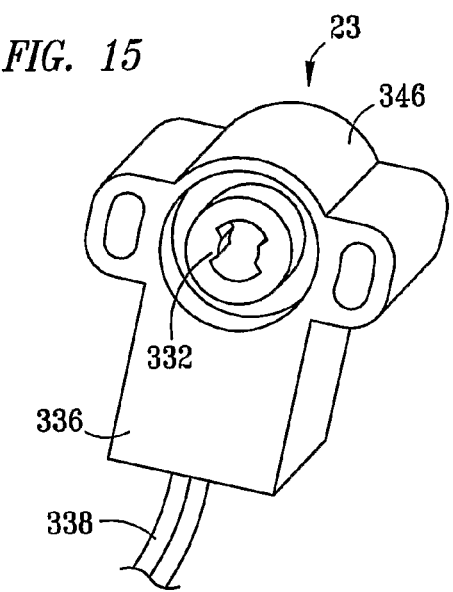

COMPRESSIBLE FLUID INDEPENDENT ACTIVE SUSPENSION

CROSS-REFERENCE TO RELATED APPLICATION

The present application is a continuation in part of and claims priority to U.S. Provisional Patent Application 60/622, 247, filed Oct. 25, 2004, entitled "COMPRESSIBLE FLUID INDEPENDENT ACTIVE SUSPENSION," and invented by Leo W. Davis, a citizen of the United States of America, and a resident of the United States of America.

TECHNICAL FIELD OF THE INVENTION

The present invention relates in general to independent vehicle suspensions, and in particular to active, independent suspensions having compressible fluid struts.

BACKGROUND OF THE INVENTION

Prior art suspension systems for vehicles have used conventional coil springs and shock absorbers. U.S. Pat. No. 5,152,547, entitled "Dual Piston Strut," and issued to Leo W. Davis on Oct. 6, 1992, discloses dual piston strut for use in vehicle suspensions. U.S. Pat. No. 6,389,341, entitled "Control System For A Vehicle Suspension," and issued to Leo W. Davis on May 14, 2002, discloses an active control system for vehicle suspension.

Prior art suspension systems have been provided for motor vehicles to isolate the vehicle frame, or chassis, from impacts and vibrations resulting from vehicle wheels traversing uneven terrain. Vehicle ride characteristics have complex dynamics characterized by nonlinearities, vehicle roll and pitch, vehicle flexibility effects, varying parameters, unknown friction, deadzones and high amplitude disturbances. Excess vibration results in artificial vehicle speed limitations, reduced vehicle-frame life, biological effects on passengers and detrimental consequences to cargo. Present automobile suspension systems traditionally use passive suspension systems which can only offer a compromise between the two conflicting criteria of comfort and performance by providing spring and dampening coefficients of fixed rates. Passive suspension systems have been provided by separate coil springs and shock absorbing dampers, in which power is not input by a controlled power source to counteract impacts and vibrations resulting from traversing the rough terrain. The traditional engineering practice of designing spring and dampening functions as two separate functions has been a compromise from its inception in the late 1800s. As a result, vehicles have always been designed, styled and built around the space-weight requirements and performance limitations of traditional suspension configurations. Due to the demands of increased fuel mileage and decreased emissions, passenger and commercial vehicles are becoming lighter, which results in the differences between laden and unladen weights of the vehicles becoming so broad that traditional suspension systems are unable to span the load range effectively, causing serious degradation in performance of the vehicle ride quality, load handling and control.

To provide increased mobility and stability, independent passive suspensions have been developed which have proven their worth in improved mobility over rough courses, but high wheel travel has sacrificed improved stability. Active suspension systems provide a solution for improved stability, as well has providing improved mobility.

Active suspension systems reduce these undesirable ride characteristics by providing active, powered components which isolate the car body from tire vibrations induced by uneven terrain, to provide improved comfort, road handling performance and safety for a variety of terrains and vehicle maneuvers. In active vehicle suspension systems, actuators are provided to actively apply forces which counteract and balance forces applied to the chassis of the motor vehicle.

SUMMARY OF THE INVENTION

A novel, active independent suspension system has dual piston, compressible fluid struts, and a control system for actively controlling operation of the dual piston, compressible fluid struts. Each of the dual piston struts has an outer cylinder and an outer piston rod, which each respectively define exterior peripheries for an outer pressure chamber and an inner pressure chamber. Pressures applied to a compressible fluid in respective ones of the outer and inner pressure chambers urge the outer piston to extend from within the outer cylinder. A control system is provided for actively controlling an amount of compressible fluid disposed within each of the inner and outer pressure chambers. Each compressible fluid strut performs three basic functions of suspension systems in a single component, acting as a fluid spring, a shock absorber and an actuator.

DESCRIPTION OF THE DRAWINGS

For a more complete understanding of the present invention and the advantages thereof, reference is now made to the following description taken in conjunction with the accompanying Drawings in which FIGS. 1 through 16, and the Figures of the attached patents, show various aspects for a compressible fluid independent active suspension devices made according to the present invention, as set forth below:

FIG. 13 is a front view of a rotary position sensor and a mounting bracket for the sensor;

FIG. 14 is a side view of the rotary position sensor and the mounting bracket;

FIG. 15 is a perspective view of the rotary position sensor; and

DETAILED DESCRIPTION OF THE INVENTION

Figure 1:
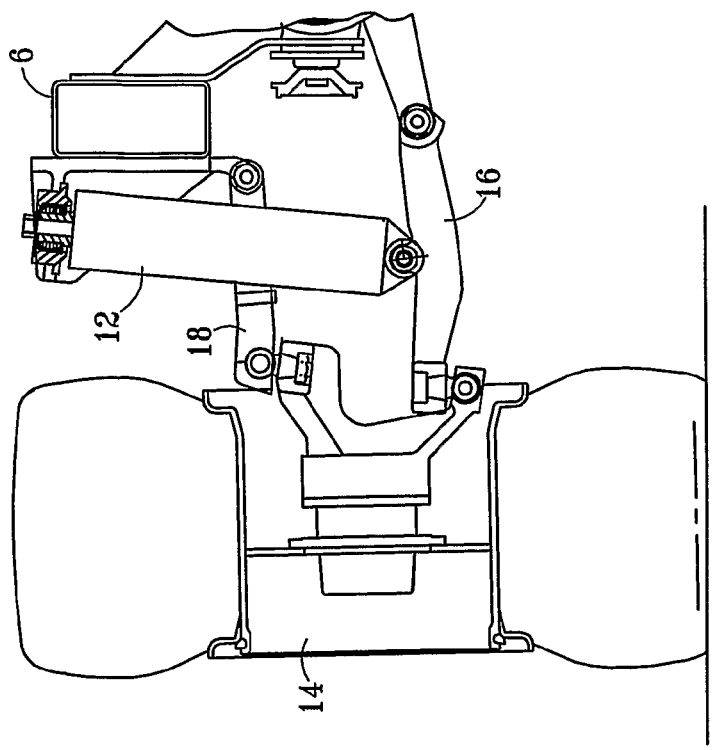
FIG. 1 is a front, elevation view of a prior art independent suspension.

Referring to the Figures, FIG. 1 is a front, elevation view of a prior art independent suspension for a vehicle, having a coil spring 8 and shock absorber 10 supporting a chassis 6 above a wheel 14. Suspension linkages 16 and 18 pivotally connect between the chassis 6 and an axle to which the wheel 14 is rotatably mounted. The coil spring connects between the chassis 6 and the suspension linkage 16, and the shock absorber 10 connects between the chassis 6 and the linkage 18. The coil spring 8 cushions the bounce, or jounce, and the rebound of the chassis 6, with the shock absorber 10 providing a damper. The coil spring 8 and the shock absorber 10 are separate components which are not actively controlled.

Figure 2:
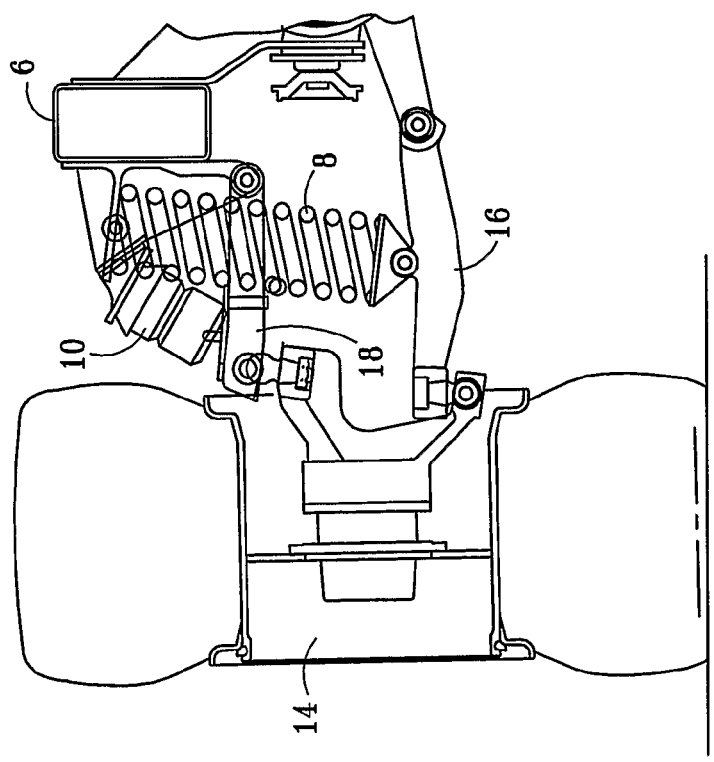
FIG. 2 is a front, elevation view of compressible fluid independent active suspension.

FIG. 2 is a front, elevation view of compressible fluid independent active suspension having a compressible fluid strut 12. The linkages 16 and 18 are pivotally connected between the chassis 6 and an axle for the wheel 14. The strut 12 connects between the chassis 6 and the linkage 16, without connecting directly to the linkage 18.

Figure 3:
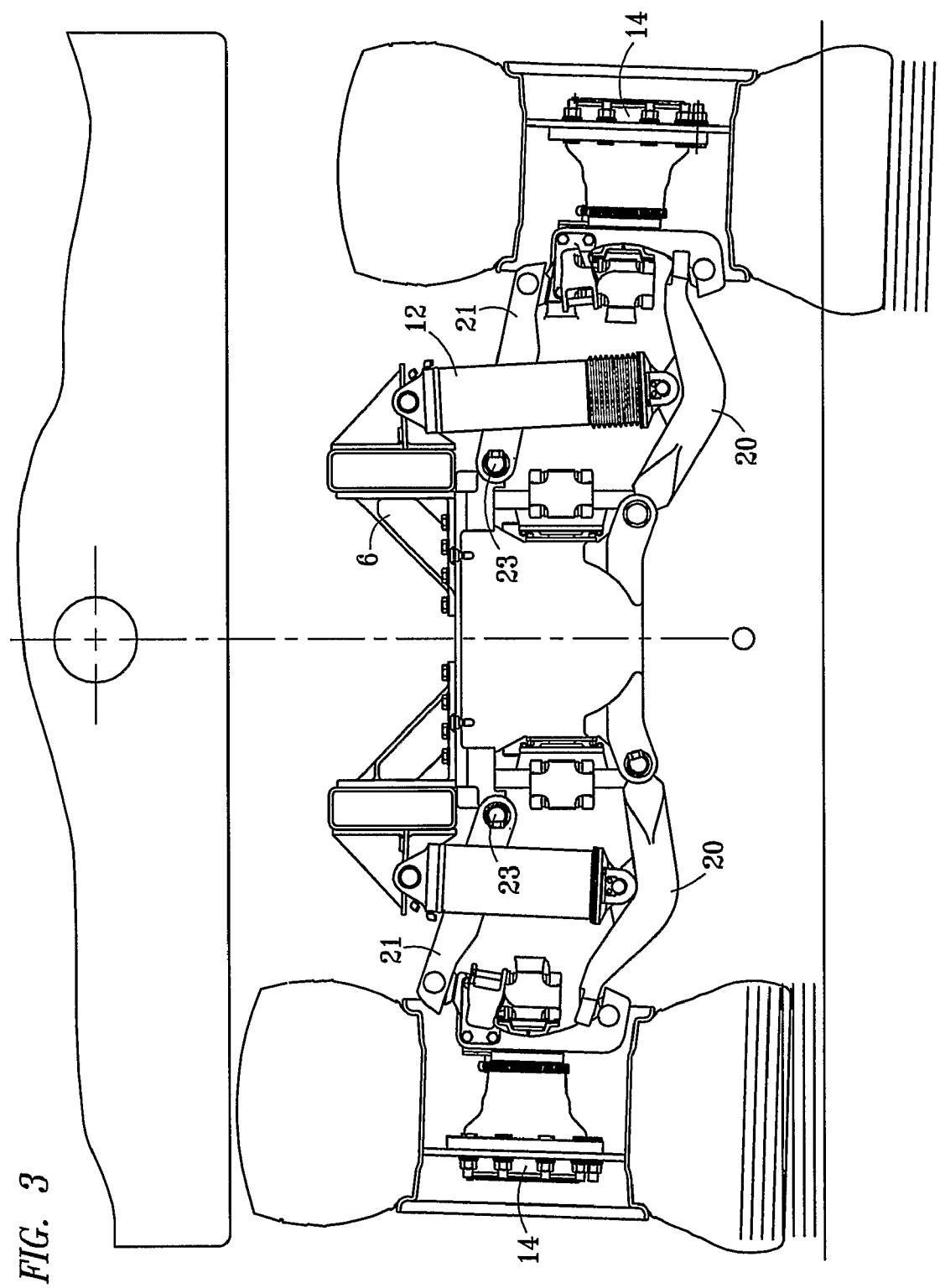
FIG. 3 is a front, elevation view of an alternative compressible fluid independent active suspension strut.

FIG. 3 is a front, elevation view of an alternative independent suspension, preferably having double A-arms 20 and 21 and two compressible fluid suspension struts 12 which are actively controlled. The struts 12 connect between the chassis 6 and respective suspension linkages 20. The linkages 20 are pivotally connected to the chassis 6 and to respective axles for the wheels 14. The suspension linkages 21 also connect between respective ones of the wheels 14 and the chassis frame 6. Preferably, rotary position sensors 23 determines the angular displacement of respective ones of the linkages 21 relative to the chassis frame 6.

Figure 4:
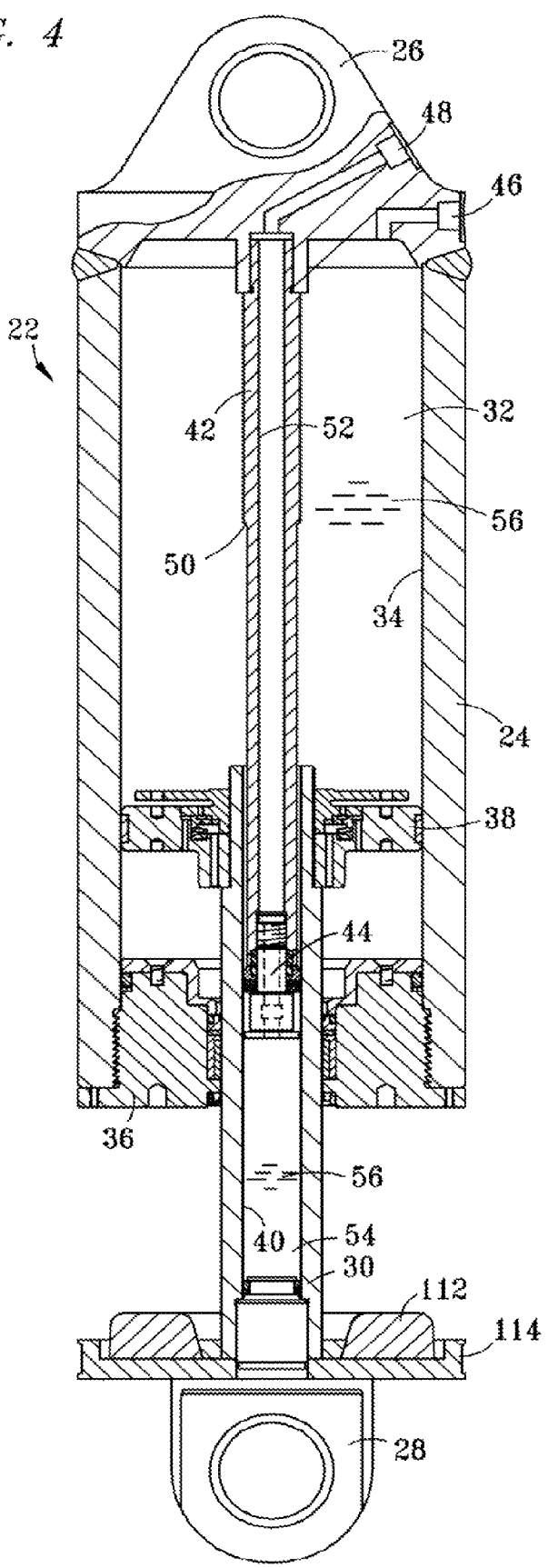
FIG. 4 is a longitudinal section view of a dual piston, compressible fluid strut.

FIG. 4 is a longitudinal section view of a dual piston, compressible fluid strut 22. The strut 22 has an outer cylinder 24 and an outer piston rod 30. The outer cylinder is connected to a strut connector 26 and the outer piston rid 30 is connected to a strut connector 28. The outer cylinder 24 has an outer cylinder bore 34 defining an outer pressure chamber. The outer piston rod 30 has an interior bore 40 which at least in part defines an inner pressure chamber 54. An outer seal assembly 36 seals one end of the outer cylinder 24. A compressible fluid 56 is disposed within outer pressure chamber 32 defined by the cylinder bore 34, and within the inner pressure chamber 54. The outer pressure chamber 32 has an exterior periphery, preferably a cylindrically shaped periphery, defined by the cylinder bore 24. The inner pressure chamber 54 has an exterior periphery, preferably a cylindrically shaped outer periphery, defined, at least in part, by the inner cylinder bore 40. A damper 38 is mounted to the outer piston rod 30 for moving through the compressible fluid 34 within the outer cylinder bore 34. An inner piston rod 42 extends into the bore 40 of the outer piston rod 30. The inner piston rod 42 has an outer shoulder 50 defined by a transition from a larger external diameter to a smaller external diameter. An inner bore 52 extends interiorly through the inner piston rod 42, for passing compressible fluid 56 between an inner cylinder flow port 48 into the inner pressure chamber 54. An outer cylinder flow port 46 is provided for passing the compressible fluid 56 into and out of the outer pressure chamber 32. A flow restrictor and inner seal assembly 44 are provided between the inner piston rod 50 and the bore 40 of the outer piston rod 30.

Figure 5A:
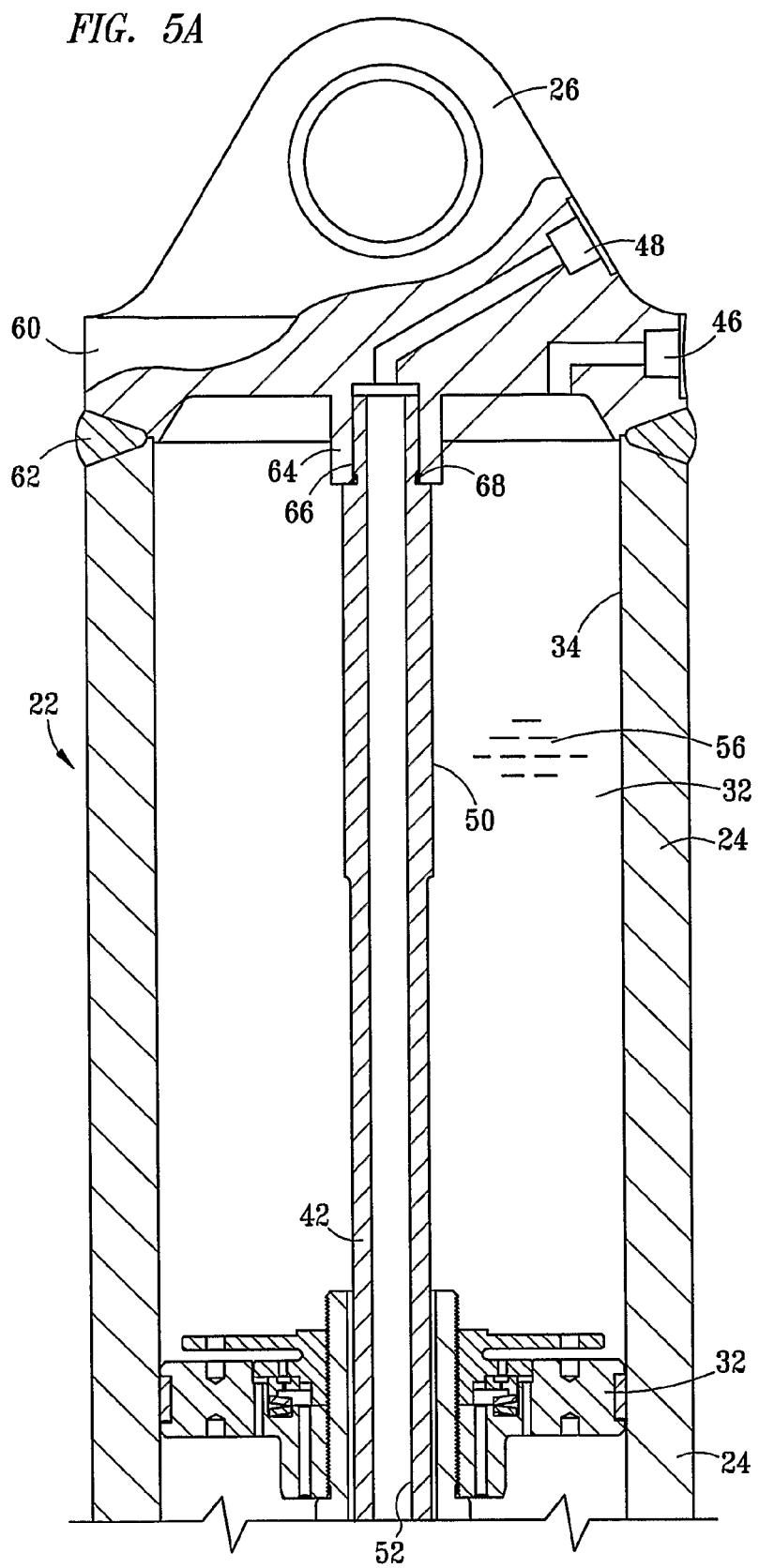
FIGS. 5A, 5B and 5c are detail views of the dual piston, compressible fluid strut of FIG. 4.
Figure 5B:
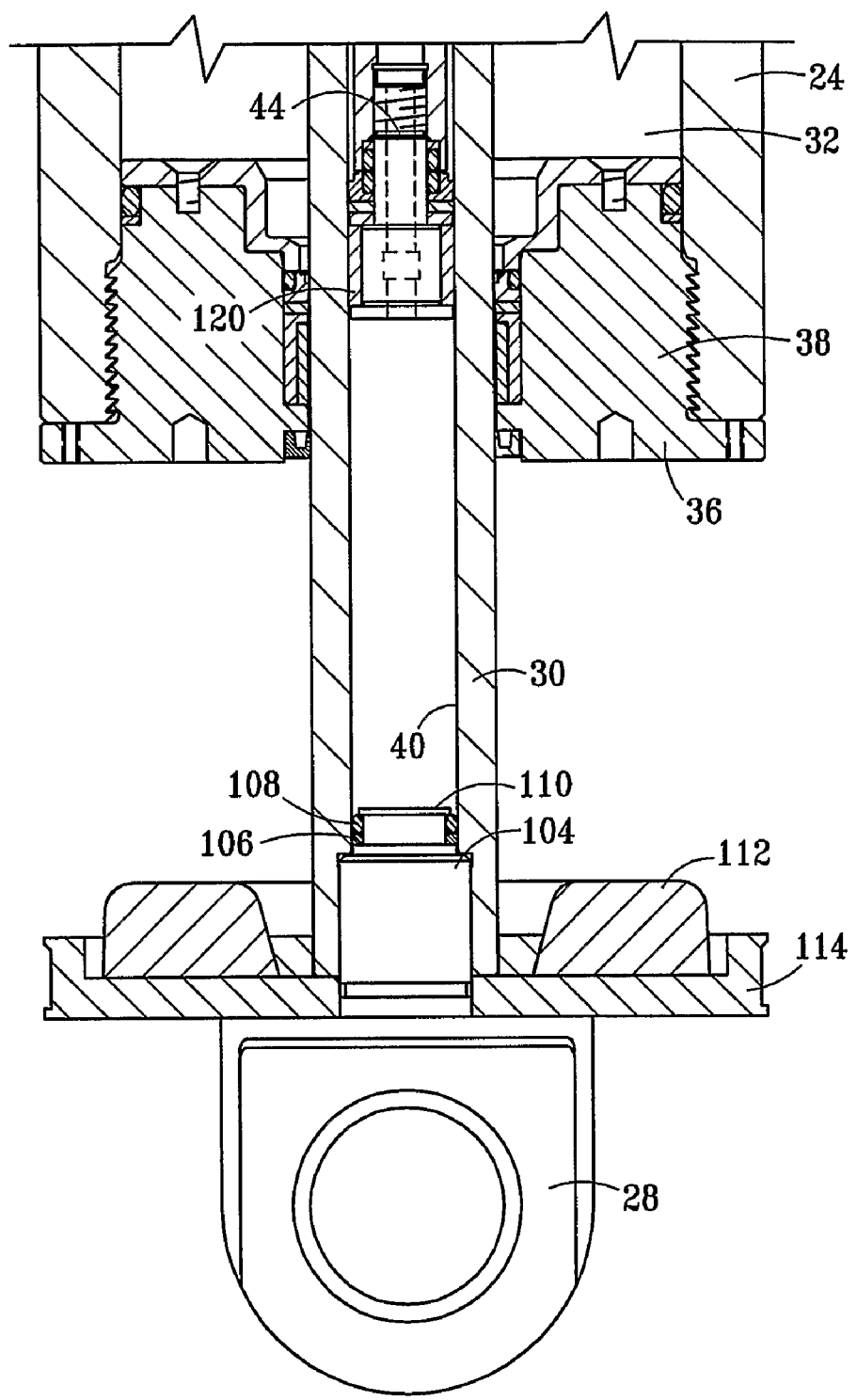
Figure 5C:
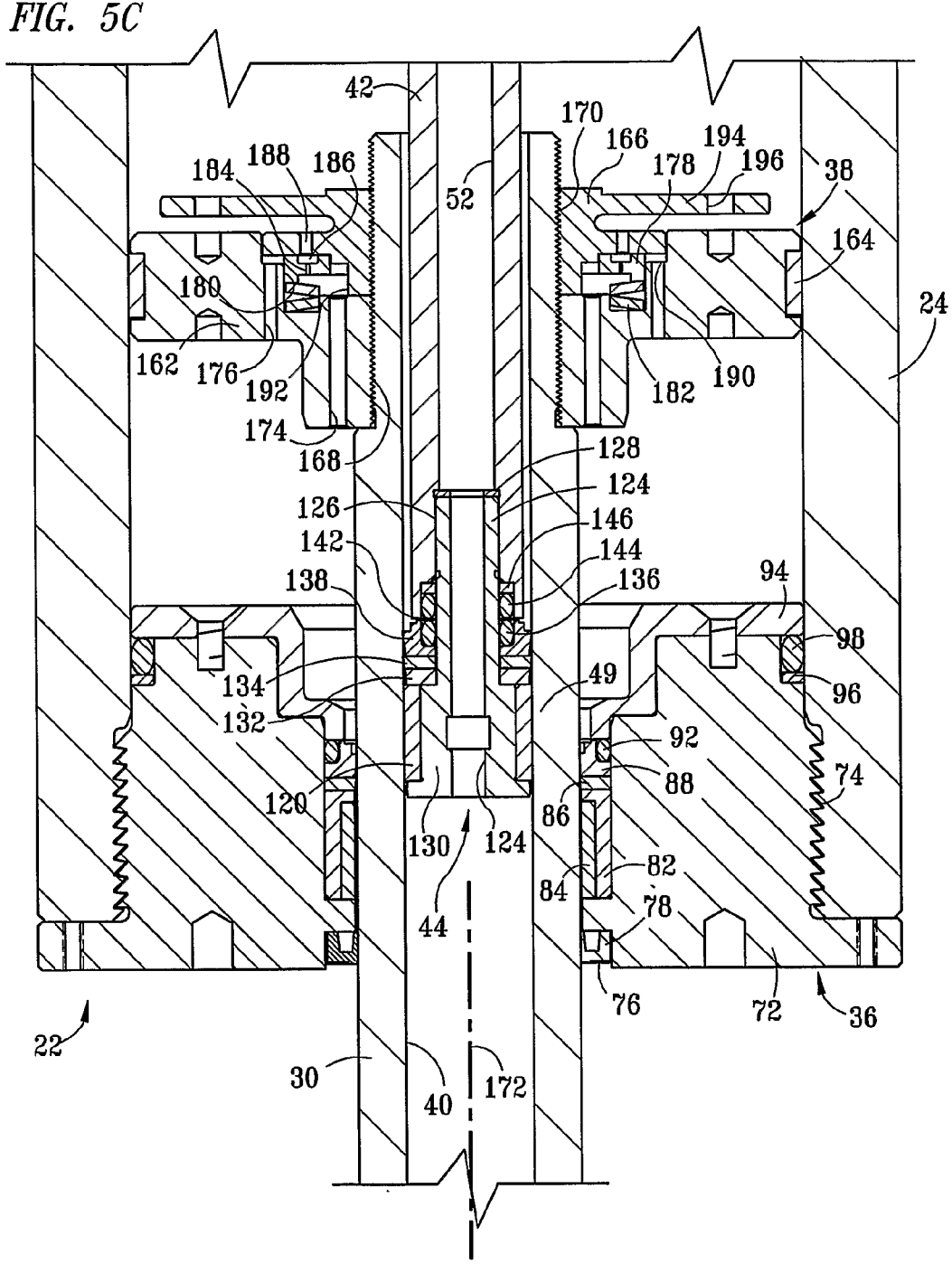

FIGS. 5A, 5B and 5C are detail views of the dual piston, compressible fluid strut 22 of FIG. 4. An end cap 60 is preferably secured by a weld 52 to one end of the outer cylinder 24. A socket 64 is preferably connected to a lower end of the inner piston rod 42 by a threaded connection 66. A seal 68 seals between the inner piston rod 42 and the socket 64.

An end fitting 72 is secured in one end of the outer cylinder 24 with a threaded connection 74. A backup ring 76 and a wiper seal 78 are secured in the end fitting 72 an adjacent to the exterior of the outer piston rod 30. A bearing sleeve 82 and a bearing 84 are secured in the fitting 72, and provide a bearing for the outer piston rod 30 in moving through the end fitting 72. A back up ring 86 is disposed adjacent to the bearing sleeve 82. An outer rod seal 88 is disposed adjacent to the back up ring 86. An O-ring 92 is provided adjacent the outer rod seal 88 for energizing the seal 88 for sealing against the outer piston rod 30. A cushion ring 94 is disposed across an inner face of the end fitting 72, and disposed against an end of the outer rod seal 88 and the O-ring 92. A back up ring 96 and an O-ring 98 are provided for sealing between the end fitting 72 and the interior bore 34 of the outer cylinder 24.

An outer rod plug 104 is disposed in one end of the outer rod 30, sealing the inner bore 40. A backup ring 106 and a seal 108 seal between the plug 104 and the bore 40 of the inner piston rod 30. A ring 110 is disposed on the inward end of the outer rod plug 104. A bumper pad 112 is disposed on the lower end of a plate 114 mounted to the strut connector 28.

An inner rod bearing 120 is mounted to an inner rod plug 124, which is secured to the inward end of the inner piston rod 42 by a threaded connections 126. A spacer 128 is disposed on the inward end of the inner rod 42. A bore 130 extends through the rod plug 124, providing a flow compressible fluid flow path. A seal is provided between the outer piston rod 30 and the inner piston rod 42, and includes a back up ring 132, a back up ring 134, an inner rod seal 138 and an O-ring 136. The O-ring 136 energizes the inner rod seal 138. A space 142 is provided between the O-ring 136 and the O-ring 142. A back up ring 146 is disposed adjacent the O-ring 144.

The dual flow rate damper 38 has a damper body 162. A wear ring 164 is disposed between the damper body 162 and the outer cylinder 24. A lock ring 166 is disposed adjacent to the damper body 162, with the damper body 162 secured to an inward end of the outer piston rod 30 by a threaded connection 168 and the lock ring 166 secured to the inward end of the outer piston rod 30 by a threaded connection 170. The damper body 162 has flow ports 174 and flow ports 176. The flow ports 174 and the flow ports 176 are spaced apart about a central axis 180 of the strut 22, and the number of the flow ports 174 and 176 may be varied to accomplish varied dampening characteristics for the dual flow rate damper 38. An annular-shaped valve member 178 is disposed within an annular-shaped spaced 180, and is biased into a first position by a plurality of bias springs 182. A plurality of flow ports 184 are provided through the valve member 178. An annular-shaped cavity 186 is provided in the end of the annular-shaped valve member 178, adjacent to the flow ports 184. A plurality of flow ports 196 are provided in the lock ring 166, in alignment with the annular-shaped cavity 186 and the flow ports 184. The cross-sectional area of the flow ports 184 are smaller than the combined cross-sectional area of the flow ports 174 and 176 to provide a more restricted flow in a first direction, as opposed to a lesser restricted flow in a second direction. Preferably, the flow through the damper 38 will be less restricted when a jounce, or bounce, is encountered by the vehicle to which the strut 22 is mounted, and the flow through the damper 38 will be more restricted when a rebound is encountered by the vehicle. As shown in FIG. 3, the strut 22 is mounted in an opposite direction to that shown in FIGS. 4-5C, with the strut connector 28 mounted beneath the strut connector 26. An annular-shaped flow chamber 190 extends adjacent to the flow ports 176 and the flow ports 188. An annular-shaped flow chamber 192 extends adjacent to the flow ports 174 and the annular-shaped flow chamber 190. An annular-shaped plate 194 extends inward of a face of the damper body 162. The flow ports 196 extend through the plate 194.

The moveable valve member 178 selectively blocks flow paths through the damper 38, by moving between first and second positions, to increase or decrease the flow through the damper 38, providing a fluidic dampening function. The annular-shaped moveable valve member 178 is moved against the force of the bias spring member 182 by movement of the damper 38 against the compressible fluid 56. Flow ports 184 are axially aligned around a longitudinal axis of the strut 22 and the damper 38, and extend through the movable valve member 178 to provide flow paths for connecting the flow ports 188 to the flow ports 174. Bevel washers preferably provide the bias members 182 which urge the movable valve member 178 into a forward position, sealingly engaging against the rearward portion of the flow ports 188 to prevent the compressible fluid 56 from passing through the flow ports 188 and to the flow ports 176. The flow ports 184 in the moveable valve member 178 connect from the flow ports 188 to the flow ports 174, providing a flow path for metering of flow of the compressible fluid 56 through the damper 38. Movement of the damper 38 in one direction causes the compressible fluid 56 to press against the rearward end of the moveable valve member 178 to push the forward end of the moveable valve member 178 against the lock ring 166, preventing the compressible fluid 56 from flowing through the flow ports 176 and to the flow ports 188, and also preventing flow of the fluid 56 through the flow path 174 and to the flow ports 188, except for that portion of the fluid 56 which passes through the metering flow paths 184 in the moveable valve member 178.

Movement of the damper 38 in a second direction urges the compressible fluid 56 to press against the forward surface of the moveable valve members 178, until sufficient force is attained to overcome the bias members 182, causing the moveable valve member 178 to move rearward and to unseat from pushing against a seat provided by the rearward end of the lock ring 166. This allows the compressible fluid 56 to pass through the flow ports 188 and into the flow ports 176 and from within the damper 38. Further movement of the valve member 178 for a further distance will cause the member 178 to move from being adjacent to a relief shoulder, allowing the compressible fluid 56 to flow both between the relief shoulder and the valve member 178, and then through the flow ports 174. Thus, the compressible fluid 56 will flow into and through the flow port 174, by passing through both the flow path 184 and the flow path extending between the relief shoulder and the member 178. This increases the effective size of the collective flow paths through the damper piston 38 to include both the flow ports 174 and 176, further reducing the dampening coefficient for the movement of the damper 38. A velocity of a minimum level is required to urge the moveable valve member 178 rearward, and once that is obtained, additional portions of the upper surface of the forward end of the moveable valve member 178 are exposed, such that the moveable valve member 178 will remain in a retracted position allowing increased flow through the damper 38. This decreases the dampening when high speeds, or high frequencies, are encountered.

Figure 6:
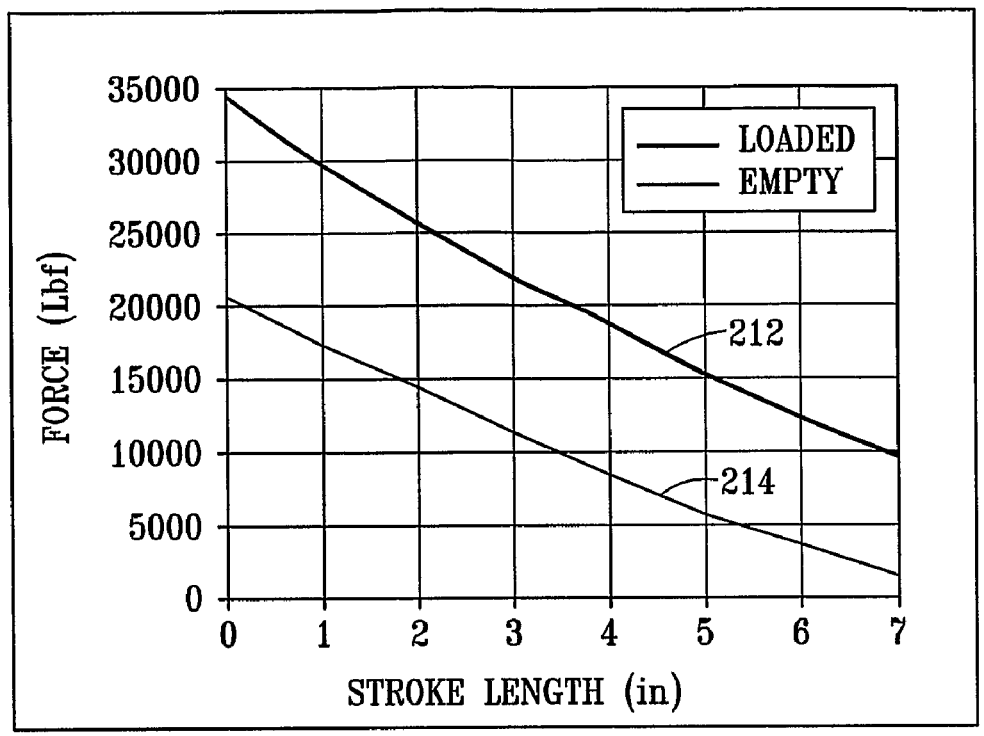
FIG. 6 is a diagram of force versus stroke length for operation of the dual piston, compressible fluid.

FIG. 6 is a diagram of force versus stroke length for operation of the dual piston, compressible fluid strut, such as strut 22. Curve 212 shows operation of the strut 22 when used in a suspension for a vehicle when the vehicle is loaded, and curve 214 shows operation of the strut when used in the suspension system when the vehicle is empty. In general, the inner chamber 54 will not be pressurized for operation with the compressible fluid 56 when the vehicle is empty, rather only the outer chamber 32 will be pressurized with the compressible fluid 56. When the vehicle is loaded, the inner chamber 54 will then be pressured with the compressible fluid 56 for use with the outer chamber 32. This provides curves 212 and 214 which are similar in slope, but offset, showing similar ride characteristics for the vehicle in both loaded and unloaded conditions.

Figure 7:
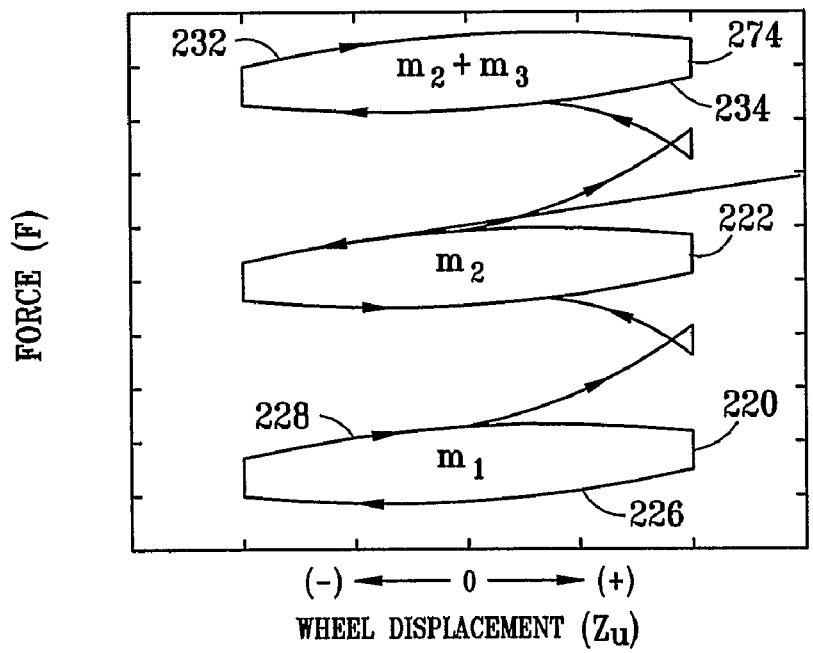
FIG. 7 is a diagram of force versus wheel displacement illustrating operation of an independent, active suspension having dual piston, compressible fluid struts.

FIG. 7 is a diagram of force versus wheel displacement illustrating operation of an independent, active suspension having dual piston, compressible fluid struts, such as the strut 22. The diagram shows the effects of active controls using a dual piston, compressible fluid strut, with the strut outer piston rod moving as a constant velocity relative to the outer cylinder. Envelope 220 shows use of a dual piston, compressible fluid strut 22 with a constant mass of the compressible fluid 56 in the outer pressure chamber 32, with curve 226 representing a rebound, and curve 228 representing a bounce, or jounce. Envelope 222 shows ride characteristics for the strut 22 after active control is used to add an additional mass of the compressible fluid 56 to the outer pressure chamber 32. Envelope 232 represents the ride characteristics of the strut 22 after active controls are used to charge and discharge the inner pressure chamber 54 with the compressible fluid 56. The envelope 232 has a bounce, or jounce, curve 232 and a rebound curve 234. The respective bounce and jounce curves of the envelopes 220, 222 and 224 are separated as a result of the dual rate flow dampening effects of the damper 38.

Figure 8:
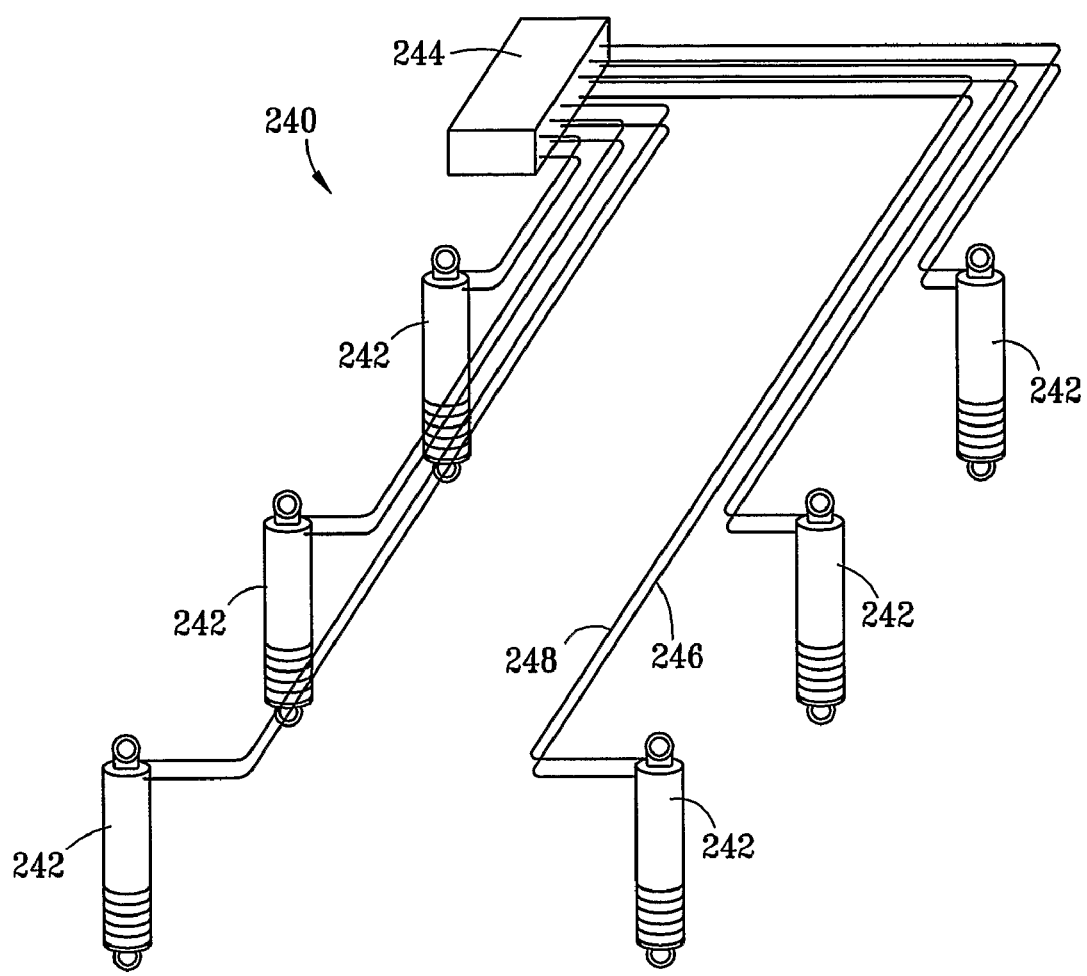
FIG. 8 is a perspective view of a control system for an independent, active suspension having dual piston, compressible fluid struts.

FIG. 8 is a perspective view of a control system for an independent, active suspension having dual piston, compressible fluid struts. Control system 240, compressible fluid struts 242, controller 244. The controller 244 preferably includes a hydraulic pump, computer, position sensor inputs and control valving. Each of the struts 242 preferably has a inner cylinder compressible fluid flow line 246 and an outer cylinder compressible fluid flow line 248. The flow lines 246 and 248 are preferably used for both charging and discharging the respective compressible fluid struts 242, with valving located in the controller 244 determining whether fluid is charged into or discharged from within the struts 242.

Figure 9:
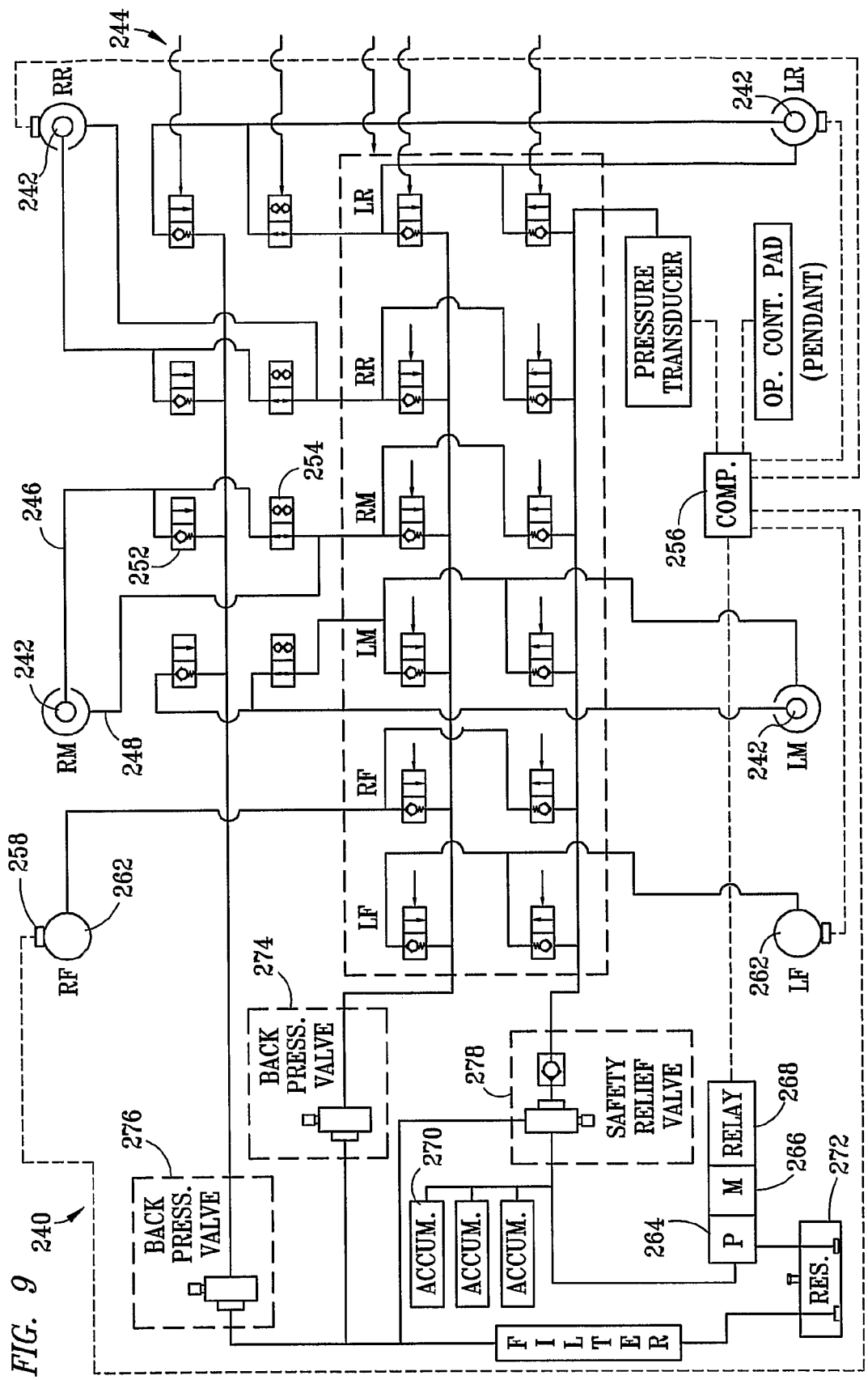
FIG. 9 is a schematic diagram of a control system for an independent, active suspension having dual piston, compressible fluid struts.

FIG. 9 is a schematic diagram of the control system 240 and the controller 244 for the compressible fluid struts 242. In this particular suspension system, the forward compressible fluid struts are preferably single piston struts 262, such as would be used under a cab for a vehicle, and the middle and rear struts are dual piston struts 242. A computer 256 receives input from each of the strut position sensors 258 to determine operation of the charge valves 252 and the discharge valves 254 for a particular one of each of the pressure chambers of the struts 252 and 262. One set of the control valves, comprising a discharge valve 252 and a charge valve 254, are provided for the single piston struts 262. Two sets of the control valves 252 and 254 are provided for the dual piston struts 242, with one set for actively controlling an inner piston and the other set for actively controlling an outer piston for each of the dual piston struts 242. The control valves 252 and 254 are preferably each solenoid valves which are electrically controlled by pulse width modulation to determine the charge and discharge of compressible fluid from the struts 242 and 262. A pressure pump 264 and motor 266 are provided, controlled by a relay 268. In this particular embodiment, the pump motor 266 is an electric motor, but in other embodiments may be an air motor or other type of motive device controlled by the computer 256. Pressure accumulators 270 and a compressible fluid reservoir 272 are provided. Optional back pressure valves 274 and 276, and a safety relief valve 278 are also provided.

Figure 10A:
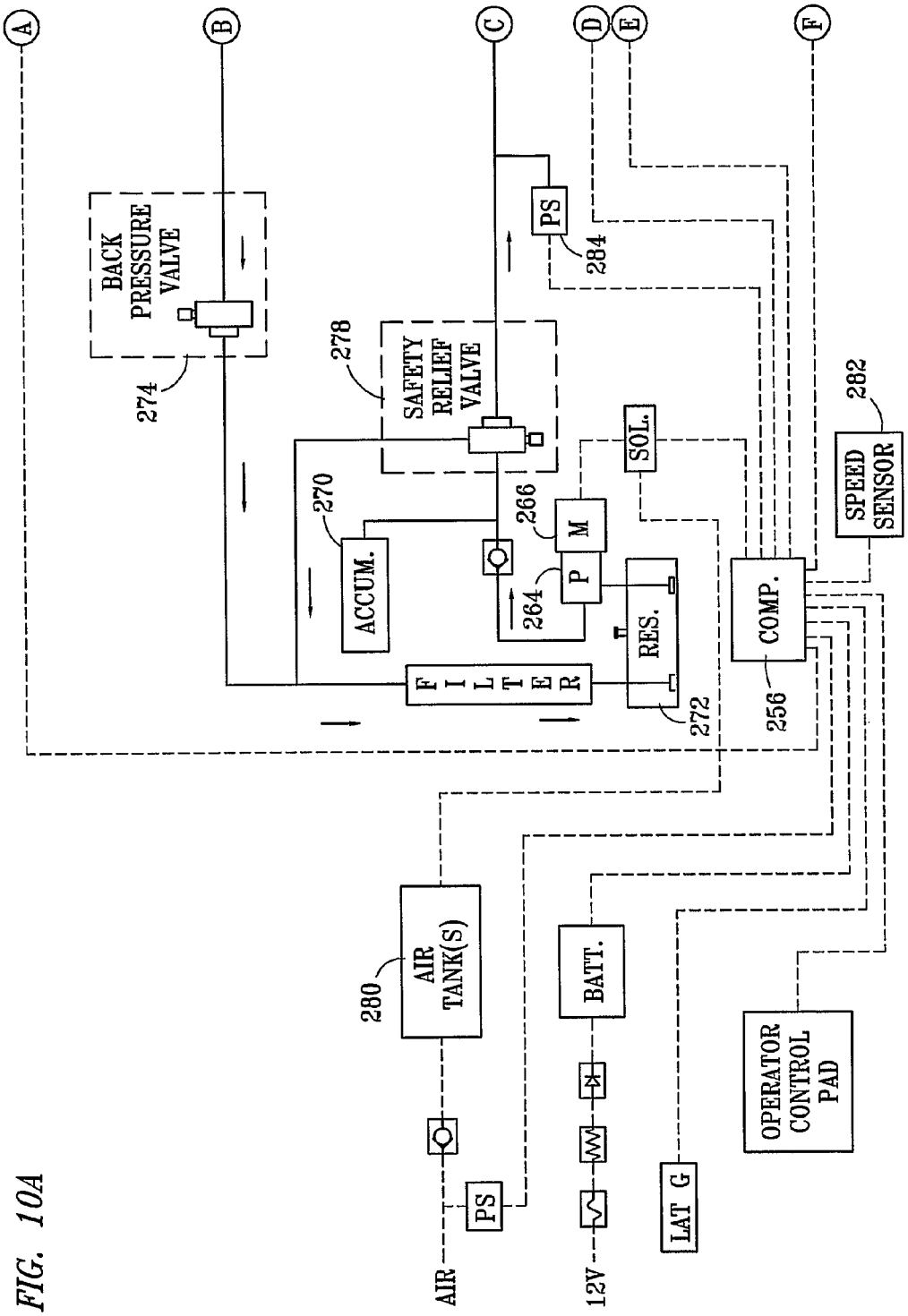
FIGS. 10A and 10B are a schematic diagram of an alternative control system for an independent, active suspension having dual piston, compressible fluid struts.
Figure 10B:
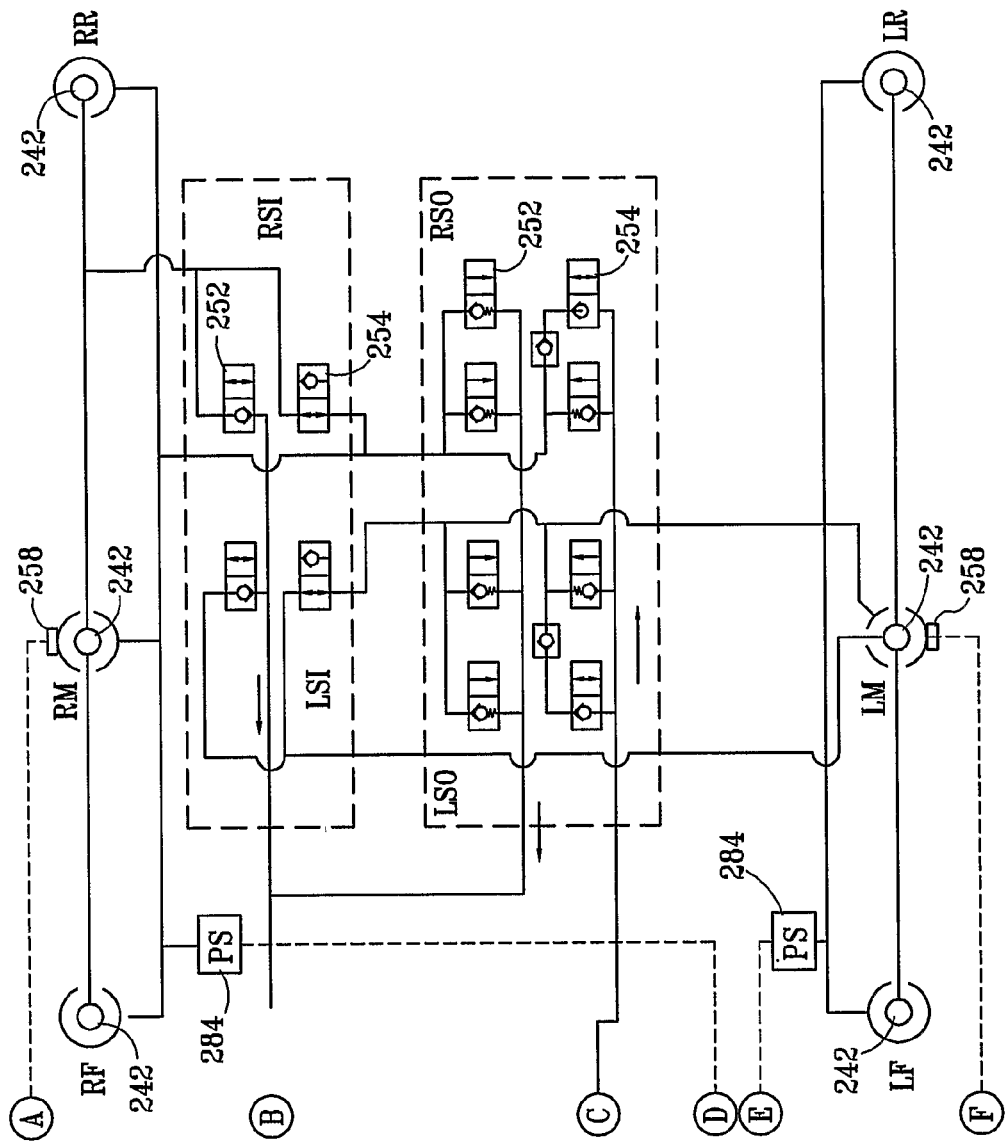

FIGS. 10A and 10B are a schematic diagram of an alternative control system for an independent, active suspension having dual piston, compressible fluid strut 242, in which reference numbers like those used in FIG. 9 are used for like parts. In this embodiment, six dual cylinder, compressible fluid struts 242 are provided for a six wheeled vehicle. Three of the struts 242 on one side of the vehicle are controlled by one set of discharge valves 252 and charge valves 254, and three of the struts 242 on the opposite side of the vehicle are controlled by a second set of discharge valves 252 and charge valves 254. The inner cylinders on one side of a vehicle having separate valves 252 and 254 from the outer cylinders the side the vehicle. A computer 256 receives input from each of the strut position sensors 258, preferably located on the center struts 242 on each side of the vehicle, to determine operation of the charge valves 252 and the discharge valves 254 for the struts 242. A first set of the control valves, comprising a discharge valve 252 and a charge valve 254, is provided for the three inner cylinders of the struts 242 a first side of the vehicle. A second set of the control valves 252 and 254 is provided for the three outer cylinders of the struts 242 on the first side of the vehicle. A third set of the control valves 252 and 254 is provided for the three inner cylinders of the struts 242 a second side of the vehicle. A fourth set of the control valves 252 and 254 is provided for the three outer cylinders of the struts 242 on the second side of the vehicle. The control valves 252 and 254 are preferably each solenoid valves which are electrically controlled by pulse width modulation to determine the charge and discharge of compressible fluid from the struts 242. A pressure pump 264 and an air motor 266 are provided, controlled by a solenoid 282 to provide air from an air tank 280. In this particular embodiment, the pump motor 266 is an air pump, but in other embodiments may be an electric motor or other type of motive device controlled by the computer 256. Pressure accumulators 270 and a compressible fluid reservoir 272 are provided. An optional back pressure valves 274 and a safety relief valve 278 are also provided.

Figure 11:
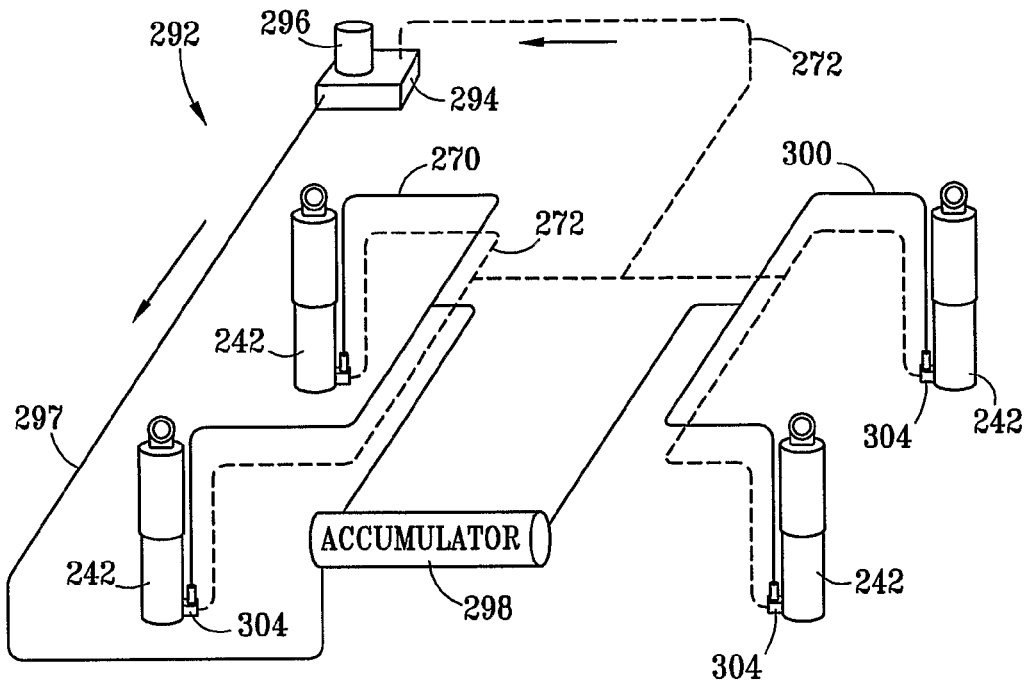
FIG. 11 is a schematic diagram of an alternative control system for an independent, active suspension having dual piston, compressible fluid struts.

FIG. 11 is a schematic diagram which illustrates an alternative embodiment of a hydraulic control unit 292 of a suspension system made according to the present invention. A reservoir 294 is connected to a pump unit 296. The pump unit 296 has an output connected by a flow line 297 to a pressure accumulator tank 298. Supply lines 300 connect from the accumulator tank 298 to control valves 304, which are mounted directly to the struts. One of the control valve 304 is mounted to each of the various struts 242. Return lines 272 for passing fluid discharged from the struts 242 by the control valves 304 to a reservoir in the hydraulic control unit 292. The control valves 304 are selectively operated to pass compressible fluid from the accumulator tank 298 to respective ones of the struts 242, such that each of the struts 242 will provide a desired force output and be of a selected length.

Figure 12:
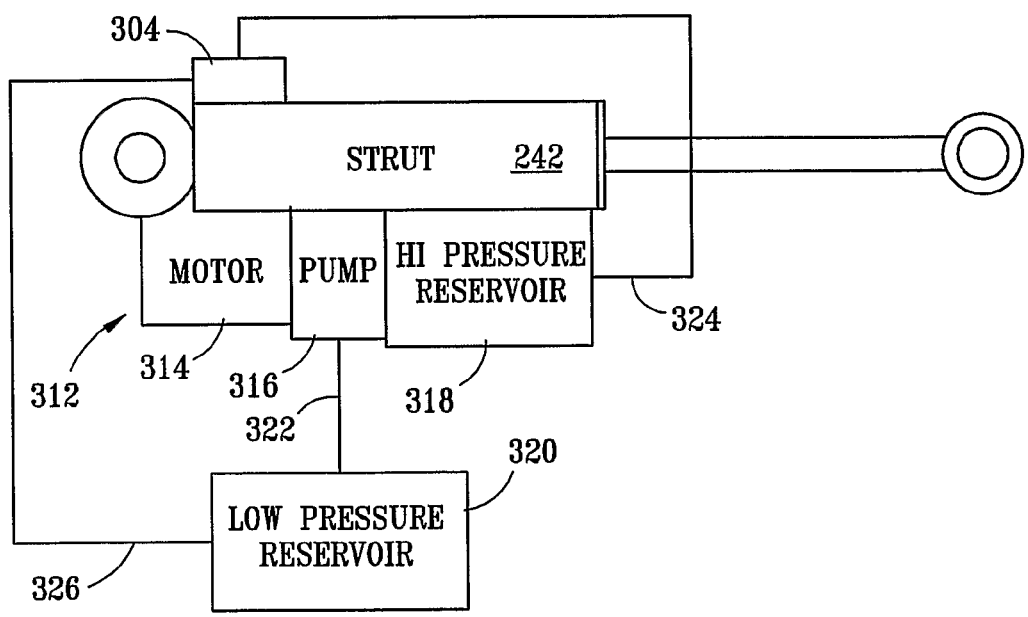
FIG. 12 is a schematic diagram for a strut mounted control system

FIG. 12 is a side elevational view of an alternative power unit 312 mounted directly to one of the struts 242. The power unit 312 includes a pump 316 and a high pressure reservoir 318. A motor 314 is secured to the pump 316 and powers the pump 316 to pressurize fluid in the high pressure reservoir 318. A control valve 304 then supplies pressurized fluid from the flow line 324 to the strut 242. A return line 326 connects the control valve 304 to a low pressure reservoir 320. A flow line 322 connects the low pressure reservoir 320 to the pump 216.

FIG. 13 is a front view of a rotary position sensor 23 and a mounting bracket 330, and FIG. 14 is a side view of the rotary position sensor 23 and the mounting bracket 330. FIG. 15 is a perspective view of the rotary position sensor 23. Referring also to FIG. 3, a rotary position sensor 23 is mounted to the chassis 6 and to one of the linkages 21, with one rotary position sensor 23 for each of the linkages 21. The shaft 332 of the sensor 23 is coupled to rotate with the linkage 21, and the bracket 330 mounts the body 286 of the sensor 23 in a fixed position on the chassis 6. Electronic components 334 within the sensor 23 determine the angular movement of the linkage 21, from which the extension of the struts 12 can be determined. In other embodiments, linear sensors may be used to determine stroke length rather than angular movement of the suspension components, such as that described in U.S. Pat. No. 6,389,341, issued May 14, 2002 to Leo W. Davis. The output of the rotary position sensor is detected by the computer 256.

Figure 16:
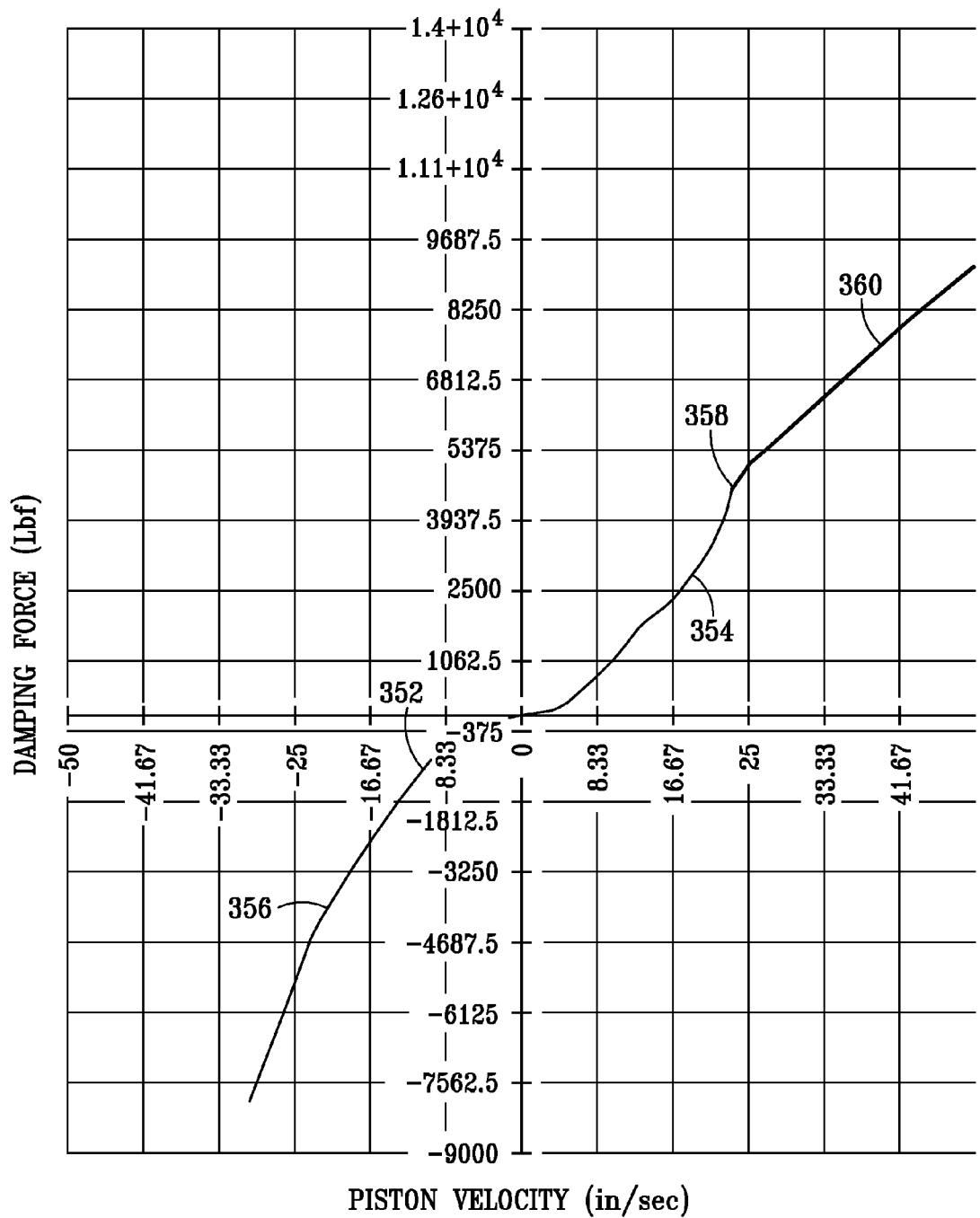
FIG. 16 is a diagram plotting dampening force versus velocity of one of the struts operated along a curved line.

FIG. 16 is a diagram plotting dampening force versus velocity of one of the struts operating according to the present invention, operated along a curved line 302. The upper portions 304 and 310 of the curved line 302 depicts a bounce or a jounce. The lower portion 306 of the curve 302 depicts rebound of the strut. There are five phases of fluid flow within the strut depicted in the curved line 102. In Phase I, the flow is through the damper plate orifices only. This is depicted along the portion 306 during the rebound, and an initial portion of the bounce, or jounce, curve 304. In Phase II, fluid flow is through the damper plate orifices and around the damper outer circumference as the damper plate is lifted by the fluid. In Phase III, fluid flow is through the damper outer circumference, with the spring operating a variable minimum. In Phase IV, fluid flow is through the damper outer circumference, with the spring at its variable maximum. In Phase V, shown along curve 310, the inner circumference of the damper is opened, which provides a pressure relief segment 360 along the curved line 302 at high velocities. On the rebound portion of the stroke, along curve 306, the inner relief segment and the damper outer circumference return to closed positions.

The mass of compressible fluid applied to individual struts is selected to determine variable spring constants and thus dampening force for each strut. The spring constants for a strut are selected during operation of the strut, preferably such that the selected spring constants provide dampening forces during a bounce, or jounce, which are approximately forty percent (40%) of calculated critical dampening forces, and such that the spring constants during rebound provide dampening forces which are approximately forty five (45%) of critical dampening forces. The critical dampening forces are the calculated value of dampening at which the strut will fully attenuate a bounce or jounce with one cycle, that is, with one bounce or jounce stroke and one rebound stroke. Spring constants which provide critical dampening forces are calculated using the following equation:

$$\omega_n = \sqrt{\frac{K_S}{m \cdot M_R}} \quad \text{(Equation 1)}$$

Where $\omega_n$ is the frequency in radians per seconds, Ks is the spring constant applied to the strut at ride height position, m is the mass acting on the strut, and MR is the moment ratio from the wheel to the strut.

The pressure drop ΔPR across the damper for the strut to provide dampening are calculated according to the following equation:

$$\Delta P_R = \frac{\rho \cdot Q_R^2}{2C_D^2 \cdot A_O^2} \quad \text{(Equation 2)}$$

Where ΔPR is the pressure reduction across the strut damper, ρ is the density of the compressible fluid, QR is the flow rate through orifices in the damper, CD is the coefficient of discharge from the ports, and Ao is the cross sectional area of the flow path of the compressible fluid through the damper of the strut. The value of the compressible fluid used for density ρ is preferably the mean density of the fluid, which typically varies in the range of ten percent (10%) over operation of a strut. The coefficient of discharge CD is selected according to the viscosity of the compressible fluid within the strut. In one example, a value for the coefficient of discharge CD of 0.548 was selected for a compressible fluid having a kinematic viscosity ranging from 100 to 200 centistokes (mm²/s), and a density of 0.035 lb per cubic inch (968 kg per cubic meter). The mass of the compressible fluid applied to a strut during a bounce, or jounce, and a rebound will determine the density of the compressible fluid within the strut.

A silicon based compressible fluid is preferably used in the compressible fluid struts for the above suspension systems. O-rings are preferably formed of nitrile. The inner and outer rod seals are preferably formed of PCTFE Neoflon, available from 3M. Bearings are preferably formed of a wound fiberglass which is coated with teflon. Cushions rings, bumpers and back up rings are preferably formed of nylon.

Thus present invention provides the advantage of actively controlling the ride characteristics for vehicle suspension systems, using a single strut to accomplish spring function, damper function and active control. The dual piston compressible fluid cylinders, when operated with active control, provide similar ride characteristics for vehicles, such as cargo vehicles, in both loaded and unloaded conditions. An inner pressure chamber is selectively pressurized when used with loaded vehicles, and the inner pressure chamber is selectively discharged when vehicles are unloaded to control ride characteristics. The amount of compressible fluids disposed within inner and outer pressure chamber is actively controlled to further control vehicle ride characteristics.

Although the preferred embodiment has been described in detail, it should be understood that various changes, substitutions and alterations can be made therein without departing from the spirit and scope of the invention as defined by the appended claims.

What is claimed is:

1. A compressible fluid independent active suspension comprising:
   a plurality of dual piston compressible fluid struts, each of said struts having an outer cylinder and an outer piston rod, said outer cylinder and said outer piston rod respectively defining exterior peripheries for an outer pressure chamber and an inner pressure chamber, wherein pressures applied to a compressible fluid disposed in respective ones of said outer pressure chambers and said inner pressure chambers urge respective ones of said outer pistons to extend from within respective ones of said outer cylinders;
   a control system for actively controlling a mass of compressible fluid disposed within each of said outer pressure chambers and said inner pressure chambers of said struts;
   a plurality flow lines connecting between said control system and respective ones of said outer pressure chambers and said inner pressure chambers;
   wherein said control system selectively controls said mass of compressible fluid within said plurality of dual piston compressible fluid struts, such that said plurality of dual piston compressible fluid struts provide spring function, shock absorber function and active control for said compressible fluid independent active suspension system; and
   wherein each of respective ones of said inner pressure chambers and said outer pressure chambers of respective ones of said struts is sealed from being in fluid communication.

2. The compressible fluid independent active suspension system according to claim 1, wherein said control system selectively determines said mass of compressible fluid within said plurality of dual piston compressible fluid struts to determine a spring constant for said plurality of dual piston compressible fluid struts.

3. The compressible fluid independent active suspension system according to claim 2, each of said struts includes a damper member extending from said outer piston rod into said outer cylinder, said damper having flow ports extending there through which are of selected size to dissipate energy absorbed by said suspension system.

4. The compressible fluid independent active suspension system according to claim 3, wherein said independent suspension system is a double A-arm type independent suspension system.

5. A compressible fluid independent active suspension system, comprising:
   a dual piston compressible fluid strut having an outer cylinder having a sealed end and an open end, an outer seal assembly sealing said open end of said outer cylinder, an outer piston rod extending through said outer seal assembly and into said outer cylinder, said outer piston rod being moveable into and out of said outer cylinder in response to loading applied to said strut, an inner piston rod, extending from said sealed end of said outer cylinder and into a bore formed into said outer piston rod and an inner seal assembly extending between said inner piston rod and said outer piston rod, and sealingly engaging there-between, wherein said outer piston rod is moveable over said inner piston rod in response to said loading applied to said strut,
   a control system for actively controlling a first mass of compressible fluid disposed within said outer cylinder and a second mass of compressible fluid within said outer piston rod of said strut;
   a plurality of flow lines connecting between said control system and said outer cylinder and said outer piston rod;
   wherein said control system separately controls said first mass of compressible fluid within said outer cylinder and said second mass of compressible fluid within said outer piston rod, such that said dual piston compressible fluid strut provides spring function, shock absorber function and active control for said compressible fluid independent active suspension system for both loaded and unloaded conditions; and wherein the first mass of compressible fluid within the outer cylinder and the second mass of compressible fluid within the outer piston of said strut is sealed from being in fluid communication.

6. The compressible fluid strut according to claim 5, wherein said outer cylinder has at least one fluid flow port for passing a compressible fluid into and for discharging said compressible fluid from within said outer cylinder.

7. The compressible fluid strut according to claim 5, wherein said bore of said outer piston rod has at least one fluid flow port for passing a compressible fluid into and for discharging said compressible fluid from within said bore of said outer piston rod.

8. The compressible fluid strut according to claim 5, wherein said outer cylinder has at least one outer cylinder fluid flow port for passing a compressible fluid into and for discharging said compressible fluid from within said outer cylinder, and said bore of said outer piston rod has at least one inner cylinder fluid flow port for passing a compressible fluid into and for discharging said compressible fluid from within said bore of said outer piston rod.

9. A method for operating an independent active suspension system for providing spring function, shock absorbing function and active control function, the method comprising the steps of:
   providing a plurality of dual piston, compressible fluid struts having an outer cylinder and an outer piston rod moveable into and out of the outer cylinder, with an outer seal extending between the outer cylinder and the piston, and an inner piston rod extending from a sealed end of the outer cylinder and into a bore formed into the outer piston rod, within an inner seal extending between said inner piston rod and said outer piston rod;
   disposing a compressible fluid within the outer cylinder and within the outer piston rod, such that movement of the outer piston rod into the cylinder compresses the compressible fluid within the outer cylinder and the outer piston rod;
   controlling a first mass of compressible fluid within the outer cylinder to determine a first spring function for the first mass of fluid in the dual piston compressible fluid strut, and thereby at least in part determine dampening forces within the dual piston compressible fluid strut;
   separately controlling a second mass of compressible fluid within the outer piston to determine a second spring function for the second mass of fluid, and further determine dampening forces within the compressible fluid dual piston strut; and
   wherein each of respective ones of the first mass of compressible fluid within the outer cylinder and the second mass of compressible fluid within the outer piston of respective ones of said struts is sealed from being in fluid communication.

10. The method according to claim 9, further comprising the steps of controlling the rate of energy dissipation within the first mass of compressible fluid by providing a damper element which extends from said piston into said outer chamber, the damper element having flow ports which, when said compressible fluid flows through the flow ports, dissipates energy absorbed by the compressible fluid during a jounce.

11. The method according to claim 9, wherein said mass of compressible fluid within said strut is selectively controlled to provide a dampening force of approximately forty to forty-five percent of a critical dampening force.

* * * * *